Feb. 19, 1946.  C. L. HALL  2,395,220
ADJUSTABLE ROTARY FASTENER STUD
Filed April 1, 1943  2 Sheets-Sheet 1

Inventor
Charles L. Hall.
By Walter S. Jones
Attorney

Feb. 19, 1946. C. L. HALL 2,395,220
ADJUSTABLE ROTARY FASTENER STUD
Filed April 1, 1943 2 Sheets-Sheet 2

Inventor
Charles L. Hall.
By Walter S. Jones
Attorney

Patented Feb. 19, 1946

2,395,220

UNITED STATES PATENT OFFICE 2,395,220

ADJUSTABLE ROTARY FASTENER STUD

Charles L. Hall, Detroit, Mich., assignor to United-Carr Fastener Corporation, Cambridge, Mass., a corporation of Massachusetts Application April 1, 1943, Serial No. 481,489

16 Claims. (Cl. 24—221)

The present invention relates to improvements in fastener installations and particularly to rotary fastener studs for cowl fasteners and the like employing a rotary stud member attached to one part of the cowling and formed with a transverse pin or member to be interlocked with a female fastener member attached to another part of the cowling. Examples of the types of fastener I have in mind are illustrated in the United States patent to Frank E. Johnson, No. 2,309,731, dated February 2, 1943, and Bedford Patent No. 2,306,928, dated December 29, 1942, though it will be readily understood that the invention may be used with other types of female fastener members designed to cooperate with a rotary stud member having radially extending arms or pins.

The assembly of rotary stud fastener installations for modern high speed aircraft requires accurate selection of a stud of predetermined length to the sockets with which it is to be used to lock the cowling parts under the desired tension. Due to many variable factors encountered in manufacture, such as variations in thickness of cowling sheets, distortions and the like, approximately thirty (30) sizes of studs are provided for studs ranging in length to care for thicknesses from .040 inch to .350 inch.

In aircraft for use in military operations, replacement of the rotary studs of such rotary fastener installations is often required and it is not advantageous to maintain such a large assortment of sizes of studs as above stated in the field repair stations.

Furthermore, in modern high speed aircraft air pressure tending to separate the cowling plates is very great, with the result that the stud member must be very strong to withstand such tension. As a safety factor such studs are at present tested to withstand a pull of at least 1,000 lbs. before acceptance.

The present invention aims to improve rotary stud members of the type described and by the provision of a stud having a transverse member providing radial arms which are readily adjustable to various distances from the head.

A further aim and object of the invention is to provide an improved adjustable rotary stud of simple construction which may be easily adjusted and which will provide a strong durable stud to withstand extremely great forces tending to separate the cowling sheets.

Illustrative of the invention, reference is made to the accompanying drawings showing preferred embodiments of the invention, and in which.

Cowl fasteners of the type referred to are advantageously used for securing together a plurality of metal, wood or the like sheets, such as airplane cowling sheets and usually comprise a stud member rotatably mounted in one of the sheets. A female fastener or socket member (not shown) which may be of any approved design, for example such as illustrated and described in the patents to Johnson, No. 2,309,731, and Bedford, No. 2,306,928, above referred to, and formed with a stud-receiving opening is mounted on another sheet. One face of the female fastener or socket member is formed with a seat suitable for engagement with radial arms of the stud member to hold the sheets securely under a high pressure tending to separate them.

As stated above, the distance between the base of the head and the axis of the radial arms (indicated at A in Fig. 1) must be determined with considerable accuracy, depending upon the thickness of the cowling sheets to be fastened and the type of female fastener or socket member used. Variations in such distances A may be adjusted for in the improved stud of my invention to compensate for variations in thickness of cowling sheets to a substantial degree.

In the illustrated embodiment of the invention the stud preferably comprises a screw member 10 having a threaded shank 11 and head 12 at one end. The head may have a tapered inner face (see Fig. 1) so as to fit in a tapered seat S' in its supporting sheet S and thus form a flush tight fastening, or the head may be rounded as illustrated in Fig. 2 and lie wholly outside of the sheet S. The threaded shank 11 is slotted longitudinally for substantially its entire length to form a transverse slot 13 diametrically of the shank.

Figure 7:
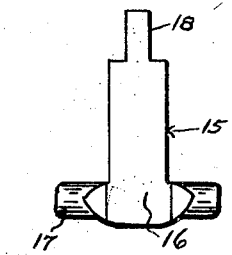
Figs. 7, 8 and 9 are side, edge and top views respectively of the pin members.
Figure 8:
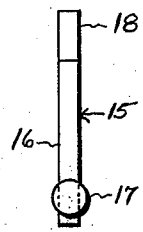
Figure 9:
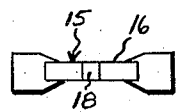

A transverse member or insert 15 (see Figs. 7 to 9) is mounted in the slot 13 and has a working fit with the faces of the slot so as to be movable axially therein. Accordingly the insert member is preferably formed from a relatively thin blank of steel of rectangular cross-section, the width corresponding to the diameter of the shank and the thickness corresponding to the depth of the slot. Thus the body of the insert fills the cross-section of the slot and reinforces the sides of the shank for a substantial portion of its length, providing considerable strength for the stud to resist rupture of the stud under high tension tending to separate the cowling sheets.

The insert 15 is advantageously formed from a T-shaped blank of flat sheet steel to provide a flat body 16 and lateral arms or extensions 17. These extensions beyond the side edges of the body may be rounded, as by a coining operation, to produce substantially cylindrical arms or extensions of larger diameter than the width of the slot 13 (see Fig. 1) and extending radially beyond the sides of the threaded shank 11 of the screw. These arms 17 or the head end of the insert are preferably hardened for strength and long wear.

The opposite or tail end of the insert body 16 is advantageously formed with a reduced non-circular extension 18 which is upsettable as at 24 to rivet the parts together after final assembly as will be explained later.

Figure 10:
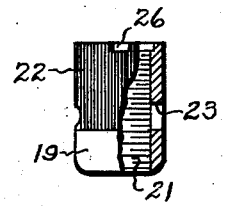
Figs. 10, 11 and 12 are side, end and side views respectively of the threaded bushing, the side view of Fig. 10 being partly in section.
Figure 11:
Figure 12:
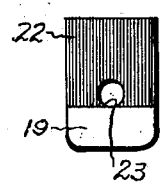
Figure 13:
Figs. 13 and 14 are edge and plan views respectively of the cap member.
Figure 14:
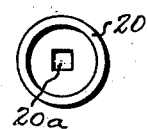

The insert 15 is operatively and adjustably connected to the screw shank by means of a threaded bushing or tubular sleeve 19 threaded upon the shank 11 and having a cap 20 riveted to the insert 15. The interior of the bushing 19 is threaded as at 21 throughout its length (see Fig. 10) to provide maximum thread engagement with the threaded shank 11, and the outer face may be knurled as at 22 for a portion of its length to facilitate turning the bushing on the shank. An opening or window 23 is formed in one side of the bushing 19, preferably about 4 threads from the bottom end (Figs. 10 and 12), in order that the operator may see that the end of the screw shank 11 is engaged by the bushing at least for a distance of 4 threads. The precise dimensions and position of this window may be varied as desired.

The cap 20 is formed with a square aperture 20ª to fit the reduced squared end or extension 18 of the insert, the terminal end of which may be upset over the cap, as at 24, to secure the screw, insert, bushing and cap in assembled relation. Thus the bushing 19 may be rotated on the shank 11 while the cap 20 remains stationary relative thereto by reason of the non-circular connection between the extension 18 and aperture 20ª.

Figure 1:
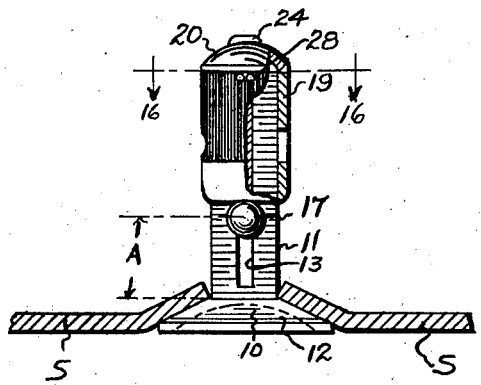
Fig. 1 is a side elevation of a preferred form of my improved stud, parts being broken away to show the interior construction and the support being shown in section as taken on the section line 1—1 of Fig. 4.
Figure 2:
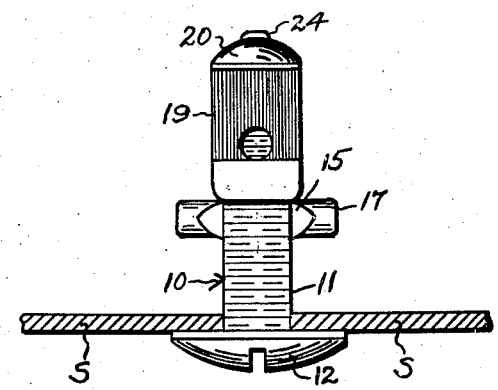
Fig. 2 is a side elevation of the stud as viewed at right angles to Fig. 1, and illustrating an alternative form of head, the support being shown in section as taken on the section line 2—2 of Fig. 4.
Figure 3:
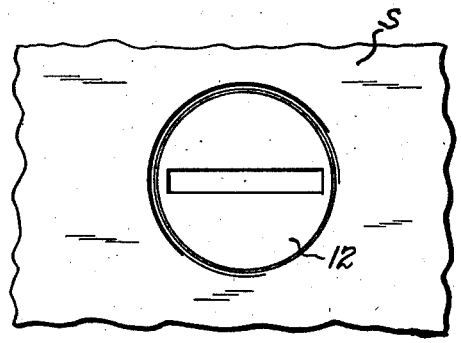
Fig 3 is a bottom plan view of Fig. 1 as viewed from the head end.
Figure 4:
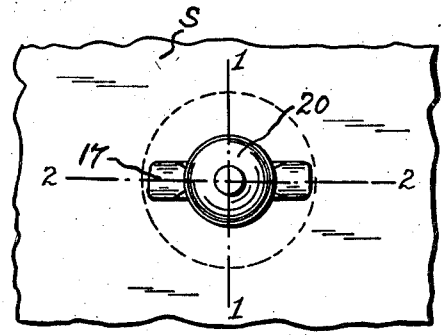
Fig. 4 is a top plan view of Fig. 2 as viewed from the nose end.
Figure 5:
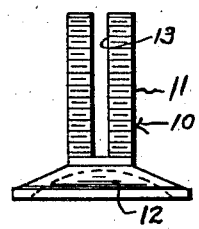
Fig. 5 and Fig. 6 are side elevation and top plan views respectively of the stud shank and head.
Figure 6:
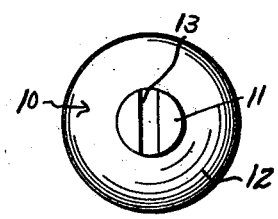

With the parts assembled as illustrated in Figs. 1 and 2, it will be apparent that rotation of the bushing 19 on the threaded screw shank 11 will raise and lower the bushing and likewise the insert 15 in the slot 13. This is insured as the bushing is of desired length to engage the cap 20 riveted to one end of the insert and the extensions 17 on the insert. Thus, as the bushing 19 is moved lengthwise of the shank 11 the insert 15 is correspondingly moved in the slot without lost motion.

Figure 15:
Fig. 15 is a plan view of the holding spring.
Figure 16:
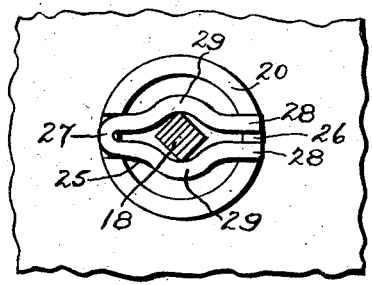
Fig. 16 is an enlarged section taken on the line 16—16 of Fig. 1.

My invention further provides means for preventing accidental or unintentional rotation of the bushing on the shank 11 and consequent movement of the insert from a preadjusted position by vibration or similar forces. This may be accomplished in any of a variety of manners by fixedly mounting a member in the bushing to engage the insert. In the illustrated form a spring clip 25 (Figs. 15 and 16) is non-rotatably mounted in notches 26, 26ª in the upper end of the bushing 19 adjacent to the cap 20 and engages corners of the rectangular end 18 of the insert. The spring clip 25 may be formed of a piece of wire bent to U-shaped form, the bight portion 27 and free ends 28 forming extensions beyond the intermediate bowed portions 29 and adapted to seat in the notches 26, 26ª of the bushing to non-rotatably mount the spring in the bushing. The bowed portions 29 have sufficient radii that when the free ends 28 are closed under tension and positioned in one of the notches 26, 26ª the inner forces of the bowed portions will engage pairs of corners of the insert extensions under tension and prevent accidental relative rotation of the screw and bushing. In Fig. 16 the spring is shown in expanded position as the bushing 19 is being turned.

The invention provides an extremely simple and effective adjustable stud highly suited for service replacement. By reason of the fact that the body of the insert fills the slot in the shank beyond the arms 17, a substantially solid and circular shank portion is provided between the arms and bushing, reinforcing the stud.

Furthermore, the threads of the bushing engage the threads of the shank throughout the major portion of their extent, providing a strong stud that will resist rupture when subjected to heavy forces tending to separate the cowling sheets.

I have chosen to illustrate the principles of my invention in connection with the above described forms of locking stud, but it is understood that the theory of my invention could be applied to devices other than those specifically illustrated and described.

Although I have illustrated and described preferred forms of my invention, I do not wish to be limited thereby because the scope of my invention is best defined by the following claims.

I claim:

1. An adjustable service rotary stud member for separable fastener installations comprising a screw member having a head and threaded shank, said shank having a narrow transverse slot disposed longitudinally thereof, a flat metal insert in said slot of a width corresponding to the diameter of said shank, lateral extensions on said insert at the lower end thereof extending radially beyond said shank, a tubular sleeve threaded on said shank, and a cap member connected to said insert, said sleeve being of a predetermined length to bear against said cap and lateral extensions.

2. An adjustable service rotary stud member for separable fastener installations, comprising a screw member having a head and threaded shank, said shank having a narrow transverse slot disposed longitudinally thereof, a flat T-shaped metal insert in said slot of a width corresponding to the diameter of said shank, lateral extensions on said insert at the lower end thereof extending radially beyond said shank, a tubular sleeve threaded on said shank, and a cap member connected to said insert, said sleeve being of a predetermined length to bear against said cap and radial extensions.

3. An adjustable service rotary stud member for separable fastener installations comprising a screw member having a head and threaded shank, said shank having a narrow transverse slot disposed longitudinally thereof, a flat metal insert in said slot of a width corresponding to the diameter of said shank, lateral substantially cylindrical extensions on the inner end of said insert of a diameter in excess of the thickness of said slot and extending radially beyond said shank, a tubular sleeve threaded on said shank, and a cap member connected to said insert, said sleeve being of a predetermined length to bear against said cap and radial extensions.

4. An adjustable service rotary stud member for separable fastener installations comprising a screw member having a head and threaded shank, said shank having a narrow transverse slot disposed longitudinally thereof, a flat T-shaped metal insert in said slot of a width corresponding to the diameter of said shank, arms on the inner end of said insert extending laterally beyond said shank, a non-circular rivet extension on the opposite end of said insert, a cap secured to said rivet extension, and a tubular threaded sleeve interposed between said arms and cap and threadedly engaging said shank.

5. A rotary stud member for separable fastener installations comprising a screw member having a head and a slotted threaded shank, a bushing threaded on said shank, an insert mounted in said slot of said shank and having portions extending radially beyond said shank and bushing, and means for operatively connecting said insert and bushing together whereby adjustment of the bushing on the shank will correspondingly adjust the insert in the slot of the shank, and means between the bushing and shank for preventing accidental rotation of said bushing on said shank.

6. A rotary stud member for separable fastener installations comprising a screw member having a head and a slotted threaded shank, a bushing threaded on said shank, an insert mounted in said slot of said shank and having portions extending radially beyond said shank and sleeve, and means for operatively connecting said insert and bushing together whereby adjustment of the bushing on the shank will correspondingly adjust the insert in the slot of the shank, and spring means non-rotatively mounted in said bushing and engaging a portion of said insert for preventing accidental rotation of said bushing in said shank.

7. A rotary stud member for separable fastener installations comprising a screw member having a head and a slotted threaded shank, a bushing threaded on said shank, an insert mounted in said slot of said shank and having portions extending radially beyond said shank and bushing, and means for operatively connecting said insert and bushing together whereby adjustment of the bushing on the shank will correspondingly adjust the insert in the slot of the shank, and means operatively associated with the bushing for visually indicating the extent of threaded engagement of said bushing and said shank.

8. An adjustable service rotary stud member for separable fastener installations comprising a screw member having a head and threaded shank, said shank having a narrow transverse slot disposed longitudinally thereof, a flat T-shaped metal insert in said slot of a width corresponding to the diameter of said shank, arms on the inner end of said insert extending laterally beyond said shank, a non-circular rivet extension on the opposite end of said insert, a cap secured to said rivet extension, and a tubular threaded sleeve interposed between said arms and cap and threadedly engaging said shank, and a spring member non-rotatably mounted in said sleeve and having portions disposed on opposite sides of said rivet extension and engaging the non-circular form thereof under tension to prevent accidental movement of said sleeve on said shank.

9. An adjustable service rotary stud member for separable fastener installations comprising a screw member having a head and threaded shank, said shank having a narrow transverse slot disposed longitudinally thereof, a flat T-shaped metal insert in said slot of a width corresponding to the diameter of said shank, arms on the inner end of said insert extending laterally beyond said shank, a non-circular rivet extension on the opposite end of said insert, a cap secured to said rivet extension, and a tubular threaded sleeve interposed between said arms and cap and threadedly engaging said shank, and a spring member non-rotatably mounted in said sleeve and having portions disposed on opposite sides of said rivet extension and engaging the non-circular faces thereof under tension to prevent accidental movement of said sleeve on said shank, said sleeve being formed with a window providing visual indication of the extent of threaded engagement of the sleeve and shank.

10. An adjustable service rotary stud member for separable fastener installations comprising a screw member having a head and a threaded shank, said shank having a narrow central transverse slot longitudinally thereof, a one-piece T-shaped insert having a flat rectangular body slidably mounted in said slot and having laterally disposed arms extending radially beyond said slot, a tubular bushing threadedly engaging the threads of said shank and operatively connected to said insert for effecting adjustment of said insert in said slot, said insert fitting said slot above the arms.

11. An adjustable service rotary stud member for separable fastener installations comprising a screw member having a head and a threaded shank, said shank having a narrow central transverse slot longitudinally thereof, a one-piece T-shaped insert having a flat rectangular body slidably mounted in said slot and having laterally disposed arms extending radially beyond said slot, a tubular bushing threadedly engaging the threads of said shank and operatively connected to said insert for effecting adjustment of said insert in said slot, said sleeve having threaded engagement with said shank throughout substantially the major portion of its circumferential extent.

12. A rotary stud member for separable fastener installations comprising a hollow shank having a head at one end thereof, said shank having a bore and a transverse slot extending longitudinally from near the head to the opposite end thereof, a member slidably mounted in the bore of said shank and having flattened portions positioned within the longitudinal slots thereof, said member having arms extending laterally beyond the outer faces of said flattened portions and radially beyond said shank, and rotary means operably connecting said shank and member and having screw-threaded connection with one of them for adjusting said member longitudinally in the slots of said shank.

13. A rotary stud member for separable fastener installations comprising a hollow shank having a head at one end thereof, said shank having a bore and a transverse slot extending longitudinally from near the head to the opposite end thereof, an insert member of generally rectangular form slidably mounted in the bore of said shank and having flattened parallel sided portions positioned in and engaging the sides of the longitudinal slot thereof, said member having arms extending laterally beyond the outer faces of said flattened portions and radially beyond said shank, and rotary means operably connecting said shank and member and having screw-threaded connection with one of them for adjusting said member longitudinally in the slots of said shank.

14. A rotary stud member for separable fastener installations comprising a hollow shank having a head at one end thereof, said shank having a bore and a transverse slot extending longitudinally from near the head to the opposite end thereof, an insert member slidably mounted in the bore of said shank and having its side margins flattened and substantially parallel sided to be positioned in and engage the sides of said slot, said member having arms extending laterally beyond the outer faces of said flattened portions and radially beyond said shank, and rotary means operably connecting said shank and member and having screw-threaded connection with one of them for adjusting said member longitudinally in the slots of said shank.

15. A rotary stud member for separable fastener installation comprising a hollow shank having a head at one end thereof, said shank having a bore and a transverse slot extending longitudinally from near the head to the nose end, an insert member slidably mounted in the bore of said shank and having its side margins substantially parallel sided to be positioned in and engage the sides of said slot, said member having integral arms extending laterally beyond the outer faces of said slot-engaged portions and radially beyond said shank, and rotary means operably connecting said shank and member and having screw-threaded connection with one of them for adjusting said member longitudinally in the slots of said shank.

16. A rotary stud member for a rotary type separable fastener adapted to be rotatably mounted in an apertured supporting member, said stud member comprising a hollow shank formed with a central bore open at one end and a transverse slot longitudinally extending from near the head to the open end, a unitary insert member of generally T-shaped configuration, said unitary insert having integral laterally extending arms for interlocking engagement with a female fastener member, and means assembled with said stud and operatively connected with said insert member whereby said insert and arms may be adjusted longitudinally of the shank of said stud.

CHARLES L. HALL.